US009672469B2

(12) United States Patent
Talley et al.

(10) Patent No.: US 9,672,469 B2
(45) Date of Patent: Jun. 6, 2017

(54) APPARATUS AND METHOD TO INCREASE ACCURACY IN INDIVIDUAL ATTRIBUTES DERIVED FROM ANONYMOUS AGGREGATE DATA

(71) Applicant: Acxiom Corporation, Little Rock, AR (US)

(72) Inventors: Terry Talley, Conway, AR (US); Derek Leonard, Conway, AR (US); Adam Zimmerman, Conway, AR (US)

(73) Assignee: Acxiom Corporation, Conway, AR (US)

( * ) Notice: Subject to any disclaimer, the term of this patent is extended or adjusted under 35 U.S.C. 154(b) by 490 days.

(21) Appl. No.: 14/479,051

(22) Filed: Sep. 5, 2014

(65) Prior Publication Data

US 2015/0081602 A1    Mar. 19, 2015

Related U.S. Application Data

(60) Provisional application No. 61/879,304, filed on Sep. 18, 2013.

(51) Int. Cl.
*G06N 7/00* (2006.01)
*G06Q 30/02* (2012.01)

(52) U.S. Cl.
CPC ............... *G06N 7/005* (2013.01); *G06N 7/00* (2013.01); *G06Q 30/02* (2013.01)

(58) Field of Classification Search
CPC .................................................. G06F 21/6245
See application file for complete search history.

(56) References Cited

U.S. PATENT DOCUMENTS

| 5,319,740 | A  | * | 6/1994  | Yamada ............... G06N 5/04 706/59 |
| 6,405,200 | B1 | * | 6/2002  | Heckerman ......... G06F 17/3089 |
| 6,687,691 | B1 | * | 2/2004  | Agrawal ........... G06F 17/30539 |
| 6,931,403 | B1 | * | 8/2005  | Agrawal ........... G06F 17/30867 707/752 |
| 7,162,451 | B2 |   | 1/2007  | Berger et al. |
| 7,197,472 | B2 |   | 3/2007  | Conkwright et al. |
| 7,197,508 | B1 |   | 3/2007  | Brown, III |
| 7,698,422 | B2 |   | 4/2010  | Vanderhook et al. |
| 7,835,990 | B2 |   | 11/2010 | Coleman |
| 7,885,958 | B2 | * | 2/2011  | Sullivan .............. G06Q 10/00 379/80 |
| 8,024,339 | B2 | * | 9/2011  | Barker ............... G06F 21/6227 707/736 |
| 8,140,502 | B2 | * | 3/2012  | Francis .................. G06F 17/30 707/705 |
| 8,375,030 | B2 | * | 2/2013  | Rane ................. G06F 17/30539 706/45 |

(Continued)

*Primary Examiner* — Stanley K Hill
*Assistant Examiner* — Mikayla Chubb

(57) ABSTRACT

An apparatus and method to increase accuracy in individual attributes derived from anonymous aggregate data uses aggregation keys in order to retrieve distribution sets and generate best-effort results for individual attributes. Multiple aggregation keys may be utilized to which individual attributes may be cross-mapped. The aggregation keys may be divided into location-based aggregation keys and name-based aggregation keys. The resulting data may be of varying granularity depending upon the granularity of the aggregation key used for the distribution and to generate the attributes.

23 Claims, 7 Drawing Sheets

(56) References Cited

U.S. PATENT DOCUMENTS

| | | | |
|---|---|---|---|
| 8,745,696 B2 * | 6/2014 | Jho | G06F 21/6245 |
| | | | 726/2 |
| 2004/0215501 A1 | 10/2004 | d'Ornano | |
| 2005/0021488 A1 * | 1/2005 | Agrawal | G06F 17/18 |
| 2007/0088713 A1 | 4/2007 | Baxter et al. | |
| 2007/0214037 A1 | 9/2007 | Shubert et al. | |
| 2008/0228768 A1 | 9/2008 | Kenedy et al. | |
| 2011/0082824 A1 * | 4/2011 | Allison | G06N 99/005 |
| | | | 706/20 |
| 2012/0278263 A1 * | 11/2012 | Borthwick | G06F 17/30303 |
| | | | 706/12 |
| 2013/0080767 A1 | 3/2013 | Francis et al. | |
| 2014/0288999 A1 * | 9/2014 | Ovadia Amsalem | G06Q 50/01 |
| | | | 705/7.29 |

* cited by examiner

| Name | Address | Gender | Income | Dwelling Type | Education |
|---|---|---|---|---|---|
| Mary Smith | 123 College Ave, Richmond, VA 23218-7626 | Female | $125,000 | Single Family | College |
| Michael Watson | 456 W 23rd St, Richmond, VA 23218-7824 | Male | $50,000 | Duplex | High School |
| Ron Washington | 36 Somerset Dr, Richmond, VA 23218-7626 | Male | $95,000 | Single Family | Graduate School |
| Megan Brooks | 67 Main St, Richmond, VA 23218-7824 | Female | $45,000 | Apartment | High School |
| ... | ... | ... | ... | ... | ... |

Fig. 2

| First Name | Census Block | Zip Code | Proprietary ID | Gender | Income | Dwelling Type | Education |
|---|---|---|---|---|---|---|---|
| Mary | 12345980813456 | 23218-7626 | ACX10 | Female | $125,000 | Single Family | College |
| Michael | 12345980830948 | 23218-7824 | ACX94 | Male | $50,000 | Duplex | High School |
| Ron | 12345980813456 | 23218-7626 | ACX99 | Male | $95,000 | Single Family | Graduate School |
| Megan | 12345980830439 | 23218-7824 | ACX10 | Female | $45,000 | Apartment | High School |
| ... | ... | ... | ... | ... | ... | ... | ... |

Fig. 3

| Aggregation Key | Key Type | Attribute | Value | Count |
|---|---|---|---|---|
| Mary | First Name | Gender | Female | 10000 |
| Mary | First Name | Gender | Male | 8 |
| Michael | First Name | Gender | Female | 25 |
| Michael | First Name | Gender | Male | 5000 |
| 12345980983456 | Census Block | Dwelling Type | Single Family | 20 |
| 12345980983456 | Census Block | Dwelling Type | Duplex | 0 |
| 12345980983456 | Census Block | Dwelling Type | Apartment | 0 |
| ACX10 | Proprietary | Gender | Female | 60 |
| ACX10 | Proprietary | Gender | Male | 40 |
| ... | ... | ... | ... | ... |

Fig. 4

APPARATUS AND METHOD TO INCREASE ACCURACY IN INDIVIDUAL ATTRIBUTES DERIVED FROM ANONYMOUS AGGREGATE DATA

CROSS-REFERENCE TO RELATED APPLICATIONS

This application claims the benefit of U.S. provisional patent application No. 61/879,304, filed on Sep. 18, 2013, and entitled "Apparatus and Method to Increase Accuracy in Individual Attributes Derived from Anonymous Aggregate Data." Such application is incorporated herein by reference in its entirety.

STATEMENT REGARDING FEDERALLY SPONSORED RESEARCH OR DEVELOPMENT

Not applicable.

BACKGROUND OF THE INVENTION

Businesses in search of methods for improving the effectiveness of their marketing campaigns are often faced with a lack of relevant customer-specific data (e.g., household income), widespread privacy policies (both public and private) that either forbid or strongly discourage the dissemination of personally identifiable information (PII), and insufficient contact information (e.g., name, IP, or email address only) to acquire the data that is available. While it is common for various forms of individual data (e.g., demographics such as age, income, buying tendencies, etc.) that would be relevant to most marketing efforts to be collected by both public and private entities, individual attributes are often not accessible due to various privacy laws, corporate policy, or increasing scrutiny of the ethics surrounding collected data. However, in many cases aggregated data that summarizes the characteristics of the population can be released because it does not contain any information that can be definitively tied to the individuals that make up the population, that is, it contains no PII. Because marketing efforts typically employ individual data, aggregate data has often been considered to be of little help to marketers. Given the wider availability of aggregate data and the broader areas available for its use, however, an effective method of using aggregate data for marketing would be highly desirable.

BRIEF SUMMARY OF THE INVENTION

The present invention in certain embodiments is directed to an apparatus and method for gaining insight about individuals (called herein "best-effort enhancement") based on anonymous aggregate data given arbitrary inputs. A computer-implemented method for deriving individual attributes from anonymous aggregate data begins with identifying one or more aggregation keys. One or more inputs are individually mapped to one or more of the aggregation keys. A distribution set associated with each of the aggregation keys is retrieved from an aggregate data store, such as a large database of aggregate data. Attributes are then generated based upon the selected distribution sets and associated aggregation keys. The invention avoids the storage or release of PII, and thereby allows marketers to use data in ways that would be difficult or impossible if PII were employed in their marketing efforts.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 2 is a diagram showing an example of the contents of a sample source file containing enhancement attributes associated with particular individuals via Personally Identifiable Information (PII).

FIG. 3 illustrates the file from FIG. 2 with aggregation keys appended and PII removed.

FIG. 4 illustrates the construction of the distribution sets from data from FIG. 3 after attribute values have been aggregated into distinct sets associated with the appropriate aggregation keys.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

The disclosed method for deriving individual-level attributes from anonymous aggregate data requires a class of data defined herein as Distribution Sets with Aggregation Keys (DSAK). To explain the rationale behind DSAK, consider as one example the national-level distributions produced by the US Census American Community Survey. For a large set of demographic attributes (e.g., age, race, income, education level, etc.), distributions that aggregate the individual attributes of all of the approximately 310 million people in the United States in 2010 are produced. Individual enhancement based on these national aggregates can then intuitively be thought of as trying to accurately pinpoint one of those 310 million people with no additional information, which is a very low probability event. DSAK increases the probability of "guessing" the right person by subdividing highly aggregated distributions based on readily available additional pieces of information. The additional piece of information is an Aggregation Key and the resulting subdivision of underlying data a Distribution Set.

Figure 1:
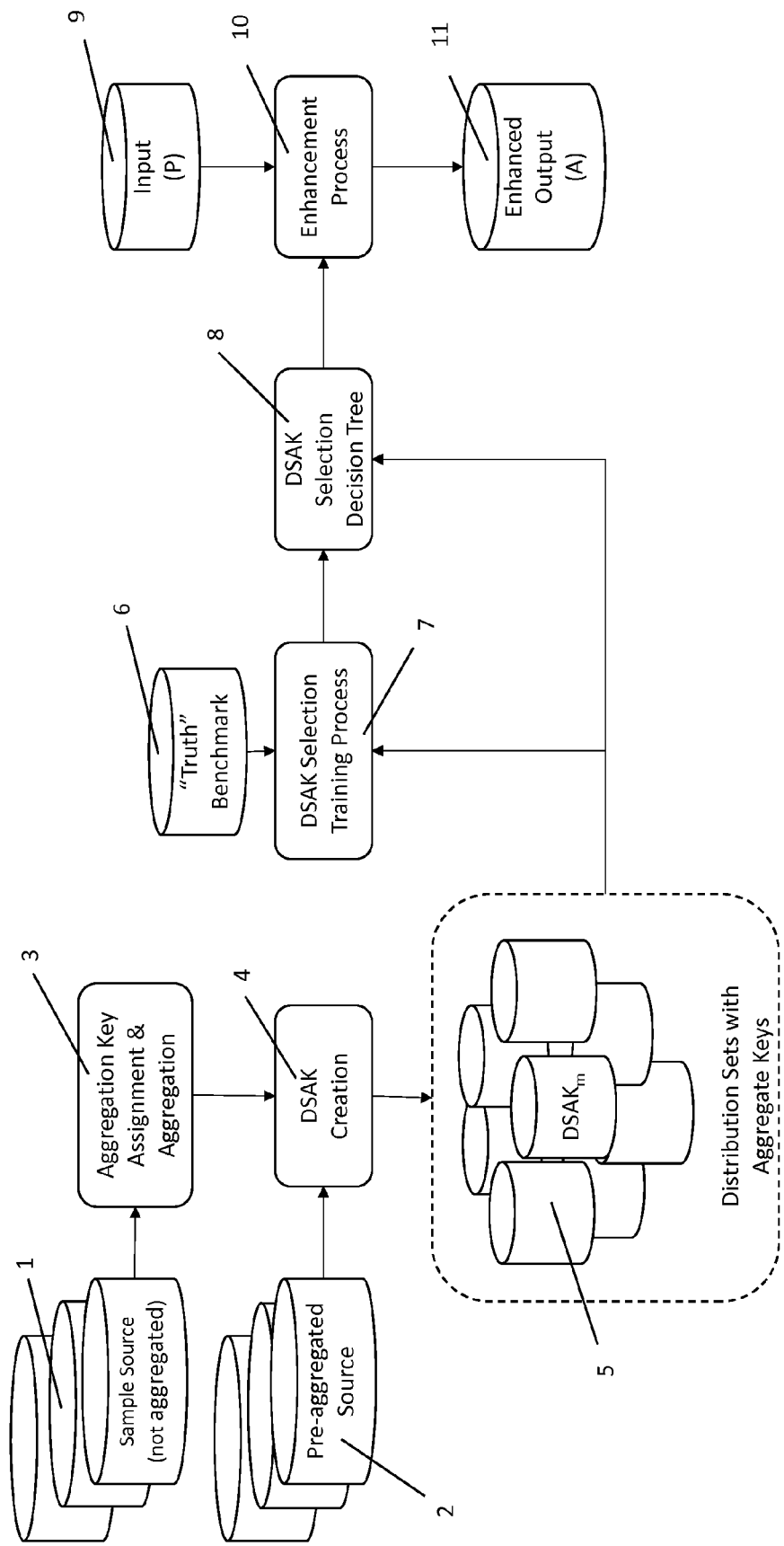
FIG. 1 is a diagram showing the complete system spanning the construction of Distribution Sets with Aggregate Keys (DSAKs) from sample sources and pre-aggregated sources, through the training of the DSAK selection decision tree algorithm, to the production use of the DSAKs and the selection decision tree for production enhancement of an input file.

FIG. 1 illustrates the entire process of (1) creating DSAKs from source input (either direct, unaggregated sample sources or pre-aggregated sources), (2) training a decision tree algorithm to select the appropriate set of DSAKs to be used for enhancement based upon the available user input and the available DSAKs, and (3) actually performing production enhancement of an input file to generate an enhanced output file. We will use this diagram to describe each set in the overall process in more detail.

During our discussion of the process described in FIG. 1, we will use the following notation:

$P=\{p_1 \ldots p_q\}$=set of possible input values to enhancement process $R=\{d_1 \ldots d_r\}$=set of values derived from the input values P $K=P \cup R=\{k_1 \ldots k_q, k_{q+1} \ldots k_{q+r}\}$=set of possible aggregate keys from the combination of input P and derived values R $A=\{a_1 \ldots a_n\}$=set of possible output enhancement values $D=\{DSAK_1 \ldots DSAK_m\}$=set of all Distribution Sets with Aggregate Key (DSAK)

DSAKs can be constructed from sources 1 that contain Personally Identifiable Information (PII), perhaps some aggregation keys, and specific attribute values or 2 from pre-aggregated sources that contain aggregation keys and attribute values and frequencies. The sample source files 1 provide specific values for all or a subset of the acceptable input values, P, and a subset of output attributes, A. These sample sources contain actual instances of specific entities (e.g., people), including both PII and attributes about those entities and the data are not aggregated. The pre-aggregated sources files are labeled 2 in FIG. 1. These sources provide specific values for all or a subset of acceptable input values, P, and a subset of output attributes, A. These sources have already aggregated individual instance data into "buckets" of values associated with some aggregation key.

Preparing sample source files for DSAK creation first requires each sample record to have a set of aggregation keys assigned, then aggregation of the values for each attribute. This process, labeled 3 in FIG. 1, aggregates individual instance data into "buckets" of values, then associates each "bucket" with one or more aggregation keys. The next few paragraphs describe this process in more detail.

Sample source files contain data for particular people (i.e., the "sample" population) that includes both PII and attributes to be included in the enhancement service (e.g., age, gender, income, etc.). As a result, data in the sample source is considered sensitive since it can be directly tied to a specific individual. Constructing a set of DSAKs allows this data to be used in aggregate without exposing PII or even an individual's enhancement data. The processing steps include derivation of aggregation keys, assignment of aggregation keys to individual records, and creation of distribution sets.

FIG. 2 gives a concrete example of a portion of a sample source file. The first step required to produce the DSAK is to derive a set of aggregation keys from which distributions will be produced at step 3 in FIG. 1 and associate those keys with each record in the sample source file. The derivation of aggregation keys is largely driven by the contents of the data itself and the availability of well-known tools such as a geocoder. In certain embodiments for this particular set of sample source data, the set of aggregation keys might be location-based aggregation keys (i.e., Census Block, Census Block Group, Zip Code, City, County, State, Country) and name-based aggregation keys (First Name, Surname). The aggregation keys may also include arbitrary proprietary groupings of individual records to be included in such a set of aggregation keys (i.e., custom proprietary boundaries).

The second step of sample source processing is to append all of the appropriate aggregation keys to the individual records from which distribution sets will be produced, which is also the point at which the data can be largely anonymized. Some of the possible aggregation keys discussed above (e.g., First Name, Census Block, Zip Code) are shown in FIG. 3 attached to the individual records from FIG. 2. FIG. 3 also contains an example of a proprietary aggregation key (i.e., Proprietary ID). Note that all demographic information remains, aggregation keys have been added to the data, and PII has been removed.

The third step of sample source processing is to aggregate the specific values for each attribute associated with an aggregation key. In certain embodiments this aggregation is accomplished via the Hadoop map-reduce framework for large-scale data processing. FIG. 4 shows an example of the aggregated attribute values and associated aggregation keys for a subset of the data from FIG. 3. At the completion of this step as part of the process labeled 3 in FIG. 1, sample source files are equivalent to pre-aggregated sources in that all PII information is removed and frequency counts are present for every attribute value associated with each aggregation key.

The process for producing DSAKs from pre-aggregated sources at step 2 in FIG. 1 is simpler since some of the steps required for sample source files have already been performed. Consider for example the Census ACS Summary File, where distributions are subdivided at multiple levels by geography, each of which produces a distinct set of data for a given attribute. The national income distribution and many other attributes are subdivided by state, Census tract, county, and block group, of which there were approximately 220,000 distinct geographies in 2010. Thus, the Census block group geography serves as an example Aggregation Key for the Distribution Set of incomes, which contains approximately 220,000 distinct distributions. Each value for an Aggregation Key (e.g., Census block) corresponds to a unique distribution in the Distribution Sets (e.g., 15 people with income less than $50,000, two people with income more than $2 million, etc.). By aggregating the data for much fewer people (e.g., approximately 1,400 vs. 310,000, 000), simply knowing (or deriving) the block group for an individual allows a much more probable guess to be made about that individual's personal attributes. Another way to interpret this effect is to note that an individual's personal attributes make a larger contribution to the distribution itself, which causes the distribution at large to be more descriptive of the individual.

After the sample source files have been processed via the Aggregation Key Assignment and Aggregation process at step 3, both the newly aggregated sample sources and the pre-aggregated sources may be used to construct the final set of DSAKs. This process takes all available distributions constructed from the entire set of sample sources and aggregated sources and produces the full collection of DSAKs, D. The DSAKs may be formatted and, in one embodiment of the invention, loaded into a database management system indexed on aggregation key for efficient retrieval during the delivery phase of DSAK. The process of collecting and formatting the DSAKs is step 4 in FIG. 1 and the resulting set of DSAKs and their storage is represented by label 5 in FIG. 1.

There are several points that should be made to refine and generalize the definition of DSAK. Note that while Census block groups, for example, are a natural Aggregation Key and provide a high level of granularity (i.e., a large number of distributions in the Distribution Set), all levels of geographic breakdown provided by the Census (e.g., state, county, tract) may also serve as Aggregation Keys. Further note that Aggregation Keys need not be geographic in nature to be effective; they should simply be chosen to produce sufficient differences between the subdivided distributions they produce. To illustrate this point consider the difference between home values, which vary widely based on geographic location, and gender, which does not. A more suitable Aggregation Key for gender turns out to be first name, which produces significantly more relevant distributions based on name than the national distribution of roughly 50% for each sex. To summarize, any data that can be aggregated based on a keyed value is appropriate for a DSAK. Examples of Aggregation Keys in certain embodiments may be as follows: Census Block, Census Block Group, Zip Code, City, County, State, Country, First Name, and Last Name.

While a significant portion of the effort to build a best-effort enhancement system based upon aggregate data is to vet and preprocess distributions based on their Aggregation Key, the process through which the delivery of enhancement data occurs requires description as well. Delivery of enhancement data involves processing a set 9 of inputs, P, through an enhancement process 10 to produce an enhanced file 11 with the enhancement attributes, A. The input, P, represents the actual provided input for which a client of the enhancement service is seeking enhancement attributes. For purposes here, the input can be considered a single instance (record) requesting enhancement, but may generally be considered a collection of input records. The enhancement process accepts the input set, P, and produces the output set, A, using the set of distribution sets, D, and the DSAK Selection Decision Tree algorithm. The output, A, represents the returned enhancement attributes from the process. The following paragraphs describes the enhancement process in more detail.

One of the issues businesses confront is having insufficient contact information about their customers to perform any meaningful enhancement. Given the set of Aggregation Keys available in the set of DSAKs (e.g., Census block Census block group, tract, state, county, first name, etc.), the first step of enhancement is to map inputs (P) 9 into at least one Aggregation Key and, more likely, a set of candidate Aggregation Keys. The enhancement process 10 exploits a DSAK Selection Decision Tree 8 to select, based upon the available candidate aggregation keys, the relevant DSAKs to retrieve from the indexed database table. Values for each enhancement attribute from A are generated based upon these distributions. The approach for generating the actual attribute value from the stored distribution of attribute values and frequencies can range from simple weighted random assignment based on the distribution to more complex interdependent models.

Based on the sample source example discussed above, for certain embodiments of the invention an example input might be "Name: Mary Smith, Census Block: 123459809813456". Based on this input, DSAKs based upon the Aggregation Keys for both first name and census block are then retrieved from the database, which yields, in part for this example, distributions of both gender and dwelling type for those particular aggregation keys. To generate the final enhancement attribute values for the given input, certain embodiments might apply simple weighted random assignment to the relevant distributions values and return "Gender: Female, Dwelling Type: Single Family".

While it would be sufficient to accept as inputs only those elements that may directly serve as Aggregation Keys, in certain embodiments the invention is further directed to another layer of mapping that takes arbitrary inputs, P, and maps them to other derived candidate Aggregation Keys. Using the example of geography as an Aggregation Key, it is highly desirable for businesses to be able to enhance based on full address, latitude/longitude, or Zip-code as well as the Aggregation Keys of Census Block Group, tract, state, etc. Other attributes that are not often associated with geographies, such as phone numbers, IP addresses, and email addresses, can also be converted into any of the geography-based Aggregation Keys. In short, the number and diversity of inputs can be significantly increased by this additional layer of deriving additional candidate aggregate keys from the input set, P. This derivation of alternative candidate keys decouples the actual enhancement of attributes from necessarily being directly based upon the inputs themselves. These derived candidate aggregate keys, R, are computed based upon the provided inputs, P. The union of the two sets of candidate keys P and R forms the full set of candidate aggregate keys, K, available for selection of the appropriate DSAKs.

Using the example data from FIGS. 2, 3, and 4, consider the example input data above (i.e., "Name: Mary Smith, Census Block: 123459809813456"). It is much more common and desirable for customers to input a latitude/longitude or street address instead of a Census Block (e.g., "Name: Mary Smith, Latitude: 37.565085, Longitude: −77.498240"). In this case the derivation of the first name aggregation key remains the same, whereas the latitude/longitude is run through a well-known geocoding process to derive the appropriate Census Block (i.e., 123459809813456). The enhancement process then continues as it did in the previous example, retrieving the appropriate distribution sets, processing them via simple weighted random assignment, and returning "Gender: Female, Dwelling Type: Single Family".

Note that the variety of allowed inputs need not directly include Aggregation Keys. Examples of such input include email addresses, social media identifiers, or other such "handles" used online. As another example of derived candidate aggregate keys, consider that these inputs may be parsed into name and location and then mapped into their respective Aggregation Key(s). The relevant, highly granular distribution is returned for use in models for the enhancement process. Note that the location of the mapped value corresponds to the level of granularity to be expected in the Aggregation Key (e.g., IP Address implies a Zip code level Aggregation Key). For name-based mappings, in many cases when a name is not explicitly provided it can be extracted from the provided information (e.g., an email address often contains partial or even full name information).

Pseudocode to illustrate the enhancement process 10 according to certain embodiments may be as follows:

```
enhance(P):
// derive alternative keys
//     may derive many alternative keys using several algorithms
    R = deriveAlternativeKeys(P)
    K = union(P, R) // K has all candidate keys
    for i = 1 to length(A)
// decision tree selection
//     select best DSAK g and associated key k
//     for attribute "A[i]"
        (g, k) = selectDSAK(i, K)
```

```
// set attribute value from selected DSAK
    A[i] = DSAK(g, i, k)
    return (A)
```

Figure 5:
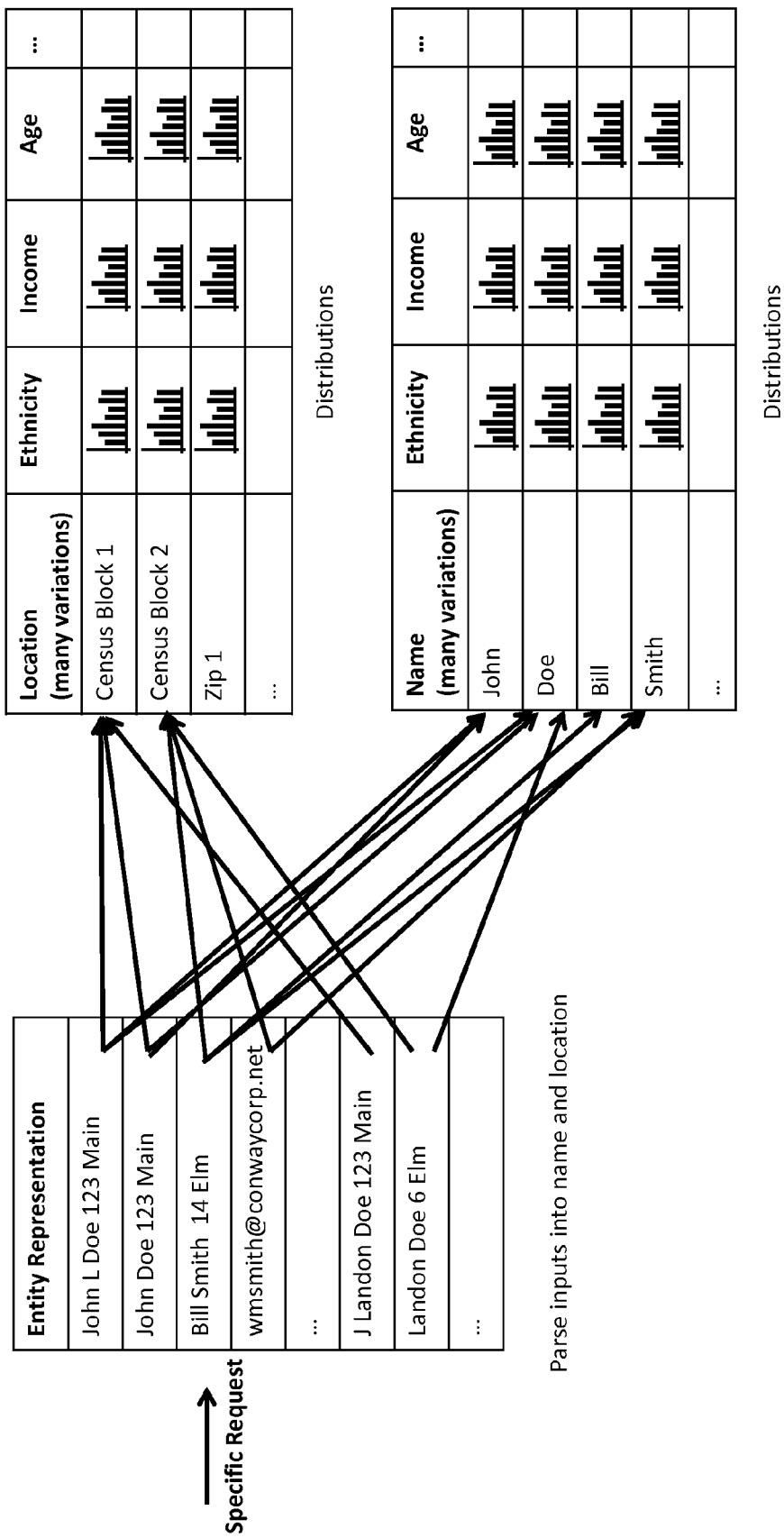
FIG. 5 conceptually illustrates the enhancement process where input to the enhancement process is mapped to one or more distribution sets and the attribute values are returned from the selected distributions.

Note that each attribute, $a_i$, in A may have multiple candidate aggregation keys from K and multiple candidate DSAKs from D that could provide a value for $a_i$. FIG. 5 illustrates this situation where for a given set of inputs there may be many possible selections of DSAKs for choosing values for different attributes (e.g., ethnicity, income, age). Selecting the best combination of distribution and aggregation key for a given attribute directly affects the quality of the delivered enhancement values and the algorithm to select the best combination may be complicated. This algorithm is represented by the "selectDSAK(i, K)" function in the enhancement pseudo-code and by the DSAK Selection Decision Tree step 8 in FIG. 1.

Recall the notational sets described earlier in this document. Let $v=DSAK_g(a_i, k_j)$ be a function that returns an value "v" for the attribute $a_i$ using the aggregate key $k_j$ and the distribution set $DSAK_g$. The challenge for the DSAK Selection Decision Tree is to pick the best $DSAK_g$ and best aggregation key, $k_j$, for a given attribute $a_i$ from the available set of DSAKs, D, and given the available candidate keys, K, such that the enhancement value assigned, v, is the best available answer.

Our approach to constructing the DSAK Selection Decision Tree is to "train" the selection algorithm based upon a benchmark set of data. This algorithm training is the process of building the decision tree for the selection of the appropriate DSAK given a particular set of input values. The "best" choice for the DSAK for a given $a_i$ may depend upon the available DSAKs, the provided input, and the relationship between other inputs and output attributes. Creation of the decision tree algorithm for handling all input cases given the set D is based upon "training" the decision tree against the "truth" benchmark.

Figure 6:
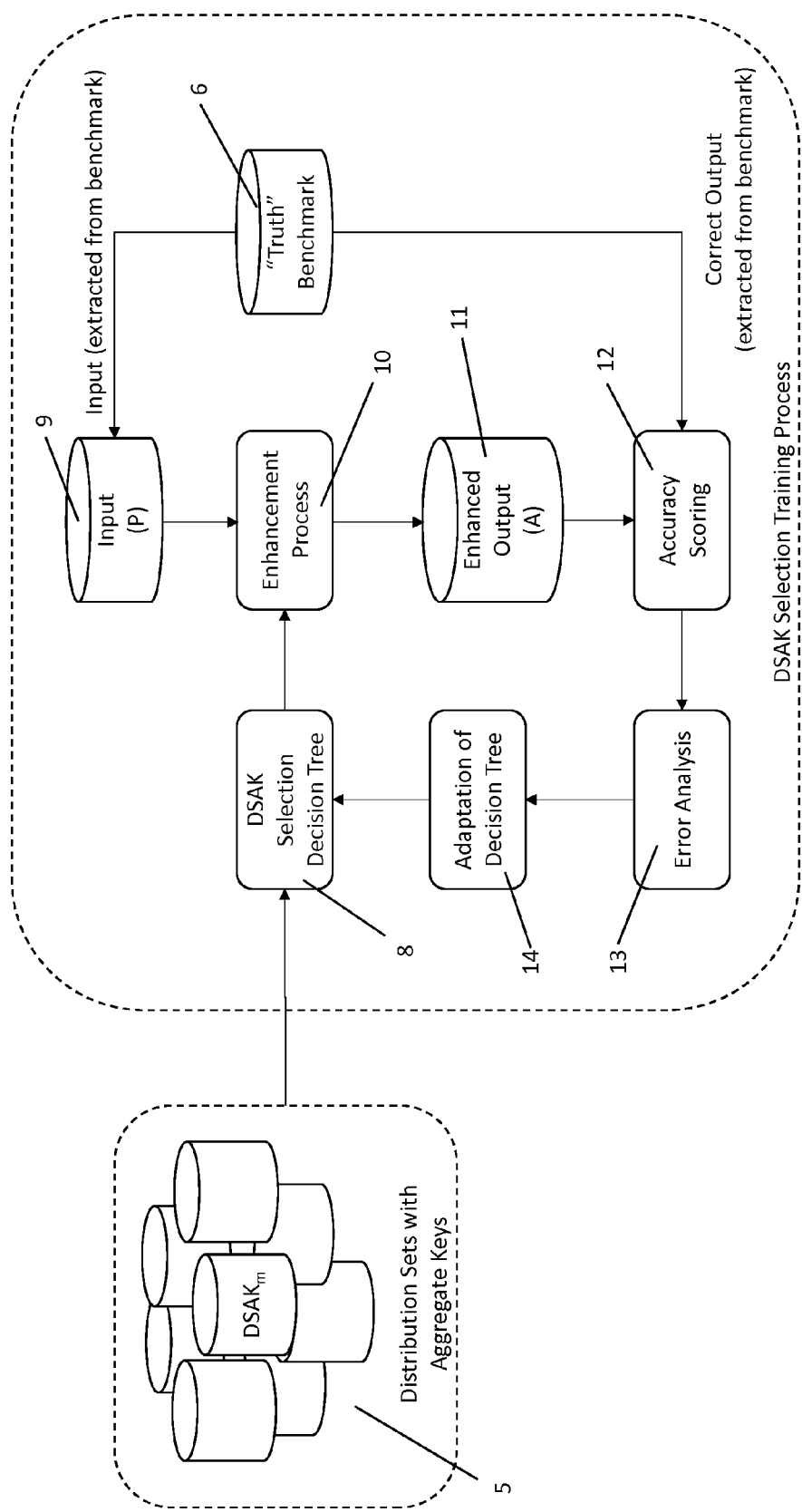
FIG. 6 illustrates the training process to construct and adapt the DSAK selection decision tree algorithm based upon scoring against a benchmark "truth set" of data.
Figure 7:
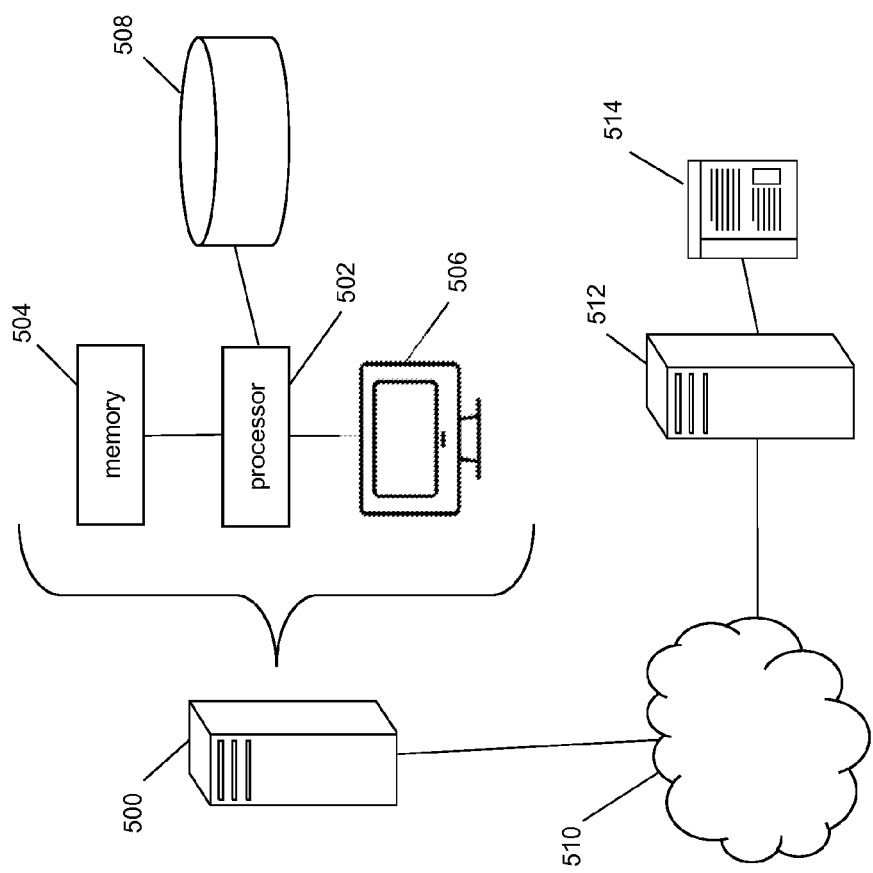
FIG. 7 illustrates a hardware network for implementing certain embodiments of the invention.

FIG. 6 illustrates the DSAK selection training process in greater detail according to certain embodiments. Acquiring and maintaining a set of benchmark data is fundamental to quantitatively measuring the accuracy of the DSAK Selection Decision Tree, the DSAKs, and the resulting enhancement attribute values. This benchmark data 6 is show in FIG. 6. This benchmark data contains specific entities (e.g., people) and an associated set of attribute values that are considered accurate for purposes of scoring the accuracy of the generated enhancement attributes. This benchmark is separately collected from the sample source files. This benchmark is often described as the "truth" set against which algorithms are evaluated. The process of acquiring and maintaining this benchmark data is outside the scope of this disclosure and we will assume the existence of this data for the description of the training process.

Assume the existence of some initial DSAK Selection Decision Tree algorithm. Initially, this algorithm may be very simple. The goal of the training process is to refine (or entirely replace) this initial algorithm with a series of algorithms that improve the measured enhancement accuracy against the benchmark data. Definition and selection of this algorithm is the output of the training process and the selected algorithm is deployed as part of the production enhancement process.

After establishment of a benchmark data set and an initial DSAK Selection Decision Tree algorithm, the training process proceeds as a repeated sequence of steps. First, input data, P, is extracted from the benchmark data. This process is shown in FIG. 6 by the extract arrow leading from the benchmark data 6 to the input 9. Next, this input P is run through the enhancement process 10 described earlier in this document. The enhanced output 11, A, is then compared to the benchmark data in an accuracy scoring process 12. The resulting scores, the enhancement attribute values, and the "true" attribute values from the benchmark are analyzed to identify sources of error between the enhanced values and the "true" values at error analysis 13. The results of this error analysis leads to adaptation of the decision tree 14. The same process is then repeated to assess the accuracy of the newly adapted DSAK Selection Decision Tree 8. This process continues until one of the set of evaluated DSAK Selection Decision Tree algorithms is selected for use in the production enhancement process. Note that there are many possible embodiments of the process of adapting the DSAK Selection Decision Tree algorithm. From the perspective of the user of the enhancement system, only the accuracy of the resulting DSAK Selection Decision Tree (and associated available DSAKs) matters, not the method used to create the decision algorithm.

In summary, the preferred embodiments are directed to Distribution Sets with Aggregation Keys (DSAK) and an enhancement process that enables increased granularity when attempting to derive individual attributes from aggregated data. The set of possible inputs can be increased significantly by the requirement that they only be mapped to a relevant Aggregation Key.

The system for implementing these steps in certain embodiments of the present invention is a computing device 500 as illustrated in FIG. 11, which is programmed by means of instructions to result in a special-purpose computing device to perform the various functionality described herein. Computing device 500 may be physically implemented in a number of different forms. For example, it may be implemented as a standard computer server as shown in FIG. 11 or as a group of servers, operating either as serial or parallel processing machines.

Computing device 500 includes in the server example of FIG. 11 microprocessor 502, memory 504, an input/output device or devices such as display 506, and storage device 508, such as a solid-state drive or magnetic hard drive. Each of these components is interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LED (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

The computing system can include a client device 512 that is the source of inputs, such as a desktop computer, laptop computer, tablet, or smartphone. In the example of FIG. 11, a desktop computer is shown. In this case, client device 512 runs a web browser 514 in order to access the Internet 510, which allows interconnection with computing device 500. A client and server are generally remote from each other and typically interact through a communication network. Client device 512 may be the source of a handle for processing as described herein, such as when a user is engaging in communications over social media or sending a request for more information through a website operated by a retailer that wishes to send a targeted marketing message to the individual.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for deriving individual-level attributes from anonymous aggregate data, comprising the steps of:
   a. creating a set of distribution sets with aggregate keys (DSAKs) from at least one source input comprising a plurality of source consumer records;
   b. training a decision tree to select a DSAK from the set of DSAKs for enhancement; and
   c. performing enhancement of an input file comprising a plurality of input consumer records to produce an output file comprising a plurality of enhanced consumer records, wherein performing enhancement comprises using the DSAK selected by the decision tree.

2. The computer-implemented method of claim 1, wherein the source input for the creating a set of DSAKs step comprises at least one sample source that is not aggregated.

3. The computer-implemented method of claim 2, further comprising the step of assigning aggregation keys to each sample source that is not aggregated.

4. The computer-implemented method of claim 1, wherein the source input for the creating a set of DSAKs step comprises at least one sample source that comprises source consumer records comprising at least one common aggregation key.

5. The computer-implemented method of claim 1, wherein the step of creating a set of DSAKs comprises the step of removing personally identifiable information (PII) from the source consumer records.

6. The computer-implemented method of claim 5, wherein the step of creating a set of DSAKs comprises the step of sorting the source consumer records based on the aggregation keys to produce a set of bucketed source consumer record groups.

7. The computer-implemented method of claim 6, further comprising the step of appending a frequency count to each of the source consumer records, wherein the frequency count represents a total number of occurrences of the aggregation key upon which the aggregation step was based for a value within each source consumer record.

8. The computer-implemented method of claim 5, wherein the step of creating a set of DSAKs comprises the step of creating a DSAK from each of the bucketed source consumer record groups.

9. The computer-implemented method of claim 1, wherein the aggregation keys are based on location.

10. The computer-implemented method of claim 1, wherein the aggregation keys are based on name.

11. The computer-implemented method of claim 1, wherein the aggregation keys are based on arbitrary proprietary groupings.

12. The computer-implemented method of claim 1, wherein the step of performing enhancement to an input file comprises the step of mapping each of the input consumer records to at least one aggregation key.

13. The computer-implemented method of claim 1, wherein the step of performing enhancement to an input file comprises the step of mapping each of the input consumer records to a plurality of aggregation keys.

14. The computer-implemented method of claim 1, wherein the step of performing enhancement to an input file further comprises the step of applying a DSAK selection tree to select one of the plurality of aggregation keys upon which to base enhancement.

15. The computer-implemented method of claim 14, wherein the step of performing enhancement to an input file further comprises the step of generating values for at least one enhancement attribute value.

16. The computer-implemented method of claim 15, wherein the step of generating values for at least one enhancement attribute value applies a simple weighted random assignment.

17. The computer-implemented method of claim 1, wherein the step of performing enhancement to an input file further comprises the step of appending at least one aggregation key to each input consumer record in the input file.

18. The computer-implemented method of claim 17, wherein the step of appending at least one aggregation key to each input consumer record in the input file comprises the step of geocoding.

19. The computer-implemented method of claim 1, wherein the step of training a decision tree comprises the application of a DSAK selection training process to an initial DSAK selection decision tree.

20. The computer-implemented method of claim 19, wherein the input file comprises an extract from a truth benchmark file comprising true consumer records.

21. The computer-implemented method of claim 20, wherein the output file is scored for accuracy.

22. The computer-implemented method of claim 21, wherein the DSAK selection tree is adapted based on the results of the step of scoring the output file for accuracy.

23. The computer-implemented method of claim 22, wherein the steps of scoring the output file for accuracy and adapting the DSAK selection tree based on the results of the scoring of the output file for accuracy are repeated until one of a set of evaluated DSAK selection tree algorithms is chosen.

\* \* \* \* \*